United States Patent [19]

Saska

[11] Patent Number: 6,096,136
[45] Date of Patent: *Aug. 1, 2000

[54] METHOD FOR PRODUCING WHITE SUGAR

[75] Inventor: Michael Saska, Baton Rouge, La.

[73] Assignee: Board of Supervisors of Louisiana State University and Agricultural and Mechanical College, Baton Rouge, La.

[ * ] Notice: This patent issued on a continued prosecution application filed under 37 CFR 1.53(d), and is subject to the twenty year patent term provisions of 35 U.S.C. 154(a)(2).

[21] Appl. No.: 08/733,515

[22] Filed: Oct. 18, 1996

Related U.S. Application Data

[60] Provisional application No. 60/044,053, Oct. 27, 1995.

[51] Int. Cl.$^7$ .................. C13J 1/06; C13D 3/12; C13F 1/02; B01D 15/00
[52] U.S. Cl. ............ 127/42; 127/46.2; 127/55; 127/58; 127/63; 210/660; 210/687
[58] Field of Search .............. 127/42, 46.2, 55, 127/58, 63; 210/660, 687

[56] References Cited

U.S. PATENT DOCUMENTS

| | | | |
|---|---|---|---|
| 4,009,706 | 3/1977 | Shaughnessey | 127/48 |
| 4,115,147 | 9/1978 | Shimizu et al. | 127/54 |
| 4,432,806 | 2/1984 | Madsen et al. | 127/48 |
| 5,454,952 | 10/1995 | Brewer | 210/651 |
| 5,468,300 | 11/1995 | Monclin | 127/43 |
| 5,468,301 | 11/1995 | Monclin | 127/55 |
| 5,554,227 | 9/1996 | Kwok et al. | 127/46.2 |
| 5,865,899 | 2/1999 | Theoleyre et al. | 127/42 |

OTHER PUBLICATIONS

R.J. Kwok, "Ultrafiltration/Softening of Clarified Juice at HC&S Puunene Mill," 53rd Annual Conference of Hawaiian Sugar Technologists (Oct. 1994).

X. Lancrenon et al., "Mineral membranes for the sugar industry," Sugar y Azucar (May 1993).

M. Saska, et al., "Concentration and Decolorization of Dilute Products from Cane Molasses Desugarization with Reverse Osmosis and Nanofiltration Membranes," paper presented at Sugar Industry Technologists Meeting (Honolulu, May 1994).

D. Hérve et al., "Production of Refined Sugar at the Cane Sugar Mill," Sugar y Azucar (May 1995).

Cameco Industries et al., "A.B.C. Process," paper distributed at 22nd I.S.S.C.T. Congress in Colombia (Sep. 1995).

U.S. application No. 08/151383, Kwok et al., filed Nov. 12, 1993.

*Primary Examiner*—Mark L. Bell
*Assistant Examiner*—Patricia L Hailey
*Attorney, Agent, or Firm*—John H. Runnels

[57] ABSTRACT

Nanofiltration is used to decolorize sugar juice or syrup. The resulting permeate may be used directly to crystallize white sugar without an intermediate step of producing a raw sugar; even though the color of the permeate is substantially higher than the highest color that is acceptable in a conventionally decolorized syrup used to crystallize white sugar. Significant cost savings are thus achieved in producing white sugar.

11 Claims, No Drawings

METHOD FOR PRODUCING WHITE SUGAR

The benefit of the Oct. 27, 1995 filing date of provisional application 60/044,053 is claimed under 35 U.S.C. §119(e).

This invention pertains to an improved method for producing white sugar.

Sugar cane juice contains both sucrose and other components. Refined white cane sugar is primarily sucrose, with most polysaccharides and other non-sucrose compounds removed. The color of refined sugar should be less than about 25 ICUMSA units ("IU," a standard measure of color in the sugar industry). In the conventional method of producing refined cane sugar, initially a raw sugar is produced at the mill by crystallization from cane juice, with only rudimentary clarification. Raw sugar typically includes polysaccharides and other compounds in addition to sucrose, and has a color in the range of 1,000 to 5,000 IU. The raw sugar is later refined, usually at an off-site refinery. The raw sugar is washed or affined; "melted" (i.e., dissolved in hot water); and then clarified to remove polysaccharides and colloids. Conventional clarification is usually performed by liming, carbonatation, and phosphatation. The clarified syrup is decolorized, typically by adsorption of impurities onto activated carbon, charcoal, or ion exchange resins. A conventionally decolorized syrup should have no more than 800 IU color for successful refining to white sugar having a color below 25 IU; for some uses, a color as high as 50 IU can be acceptable. Traditional refining methods suffer from high energy costs, high chemical reagent costs, and high waste disposal costs.

Ceramic ultrafiltration membranes with pore sizes ranging between 0.05 to 0.2 $\mu$m (500 to 2,000 Å) have been used to clarify cane juice, i.e., to remove turbidity and colloidal particles from the juice. Ceramic ultrafiltration membranes can be made, for example, in the form of single- or multichannel tubes formed of a thin $TiO_2$, $ZrO_2$, or $Al_2O_3$ coating on an $Al_2O_3$, silicate, or carbon support. See R. J. Kwok, "Ultrafiltration/Softening of Clarified Juice at HC&S Puunene Mill," 53rd Annual Conference of Hawaiian Sugar Technologists (October 1994); and X. Lancrenon et al., "Mineral membranes for the sugar industry," Sugar y Azucar (May 1993). Clarification by ultrafiltration allows several modifications to be made to the traditional process, such as juice softening with ion exchange resins, production of very-low-color sugar (VLC), and desugarization of B or C molasses.

Based on the size (or molecular weight) of the targeted particles, membranes used in filtration are usually classified as reverse osmosis (RO), nanofiltration (NF), ultrafiltration (UF), or microfiltration (MF) filters. UF filters usually have a pore size in the range from about 80 Å to about 2,000 Å, and a molecular weight cut-off (for saccharide-type molecules) in the range from about 20,000 to about 400,000. NF filters usually have a pore size in the range from about 10 Å to about 80 Å, and a molecular weight cut-off in the range from about 200 to about 20,000. "Molecular weight cut-off," an approximate measure of membrane pore size, is usually defined as the molecular weight of a compound that is rejected by the membrane at more than 90%.

R. J. Kwok et al., "Process of manufacturing crystal sugar from an aqueous sugar juice such as cane juice or sugar beet juice," U.S. patent application Ser. No. 08/151,383, filed Nov. 12, 1993, now U.S. Pat. No. 5,554,227, discloses a process for removing turbidity from clarified juice by tangential microfiltration, ultrafiltration, or nanofiltration. The disclosure states that the molecular weight cut-off should be at least 1,000, and that good results were obtained with a membrane having a molecular weight cut-off of 300,000, with a pore diameter of 0.1 $\mu$m (i.e., 1,000 Å). An intermediate crystallized raw sugar of color not more than 300 IU is first produced, and then remelted and decolorized on an adsorbent in a decolorization column; or in a variant, decolorization of the remelted 300 IU syrup can be effected by tangential ultrafiltration or nanofiltration of the syrup.

M. Saska et al., "Concentration and Decolorization of Dilute Products from Cane Molasses Desugarization with Reverse Osmosis and Nanofiltration Membranes," paper presented at Sugar Industry Technologists Meeting (Honolulu, May 1994) discloses the processing of the "invert" and "raffinate" liquid fractions that are byproducts of the desugarization of cane molasses. Reverse osmosis of both the invert and raffinate fractions was used to concentrate the non-aqueous components of those fractions; i.e., to remove water from the retentate. In a separate process, nanofiltration of the invert fraction was used to decolorize the sugars of the invert syrup. The sugars in the invert syrup are primarily glucose and fructose, with smaller amounts of sucrose and other carbohydrates. Because glucose and fructose do not crystallize easily, the decolorized invert syrup would be useful primarily as a liquid sweetener.

D. Hérve et al., "Production of Refined Sugar at the Cane Sugar Mill," Sugar y Azucar (May 1995) discloses the use of ultrafiltration to remove turbidity from sugar juice, including macromolecules such as waxes, dextrans, and gums. The resulting filtrate was decolorized by an ion-exchange process.

Cameco Industries et al., "A.B.C. Process," paper distributed at 22nd I.S.S.C.T. Congress in Colombia (September 1995) discloses the use of ultrafiltration to remove particulate matter larger than 0.2 microns, followed by decolorization by adsorption on a macroporous styrene divinylbenzene sorbent with a specific amount of a weak base anion functionality.

A new, direct route has been discovered for the production of crystalline white cane sugar, a route that requires no intermediate steps of crystallizing and subsequently remelting a raw sugar. It has been discovered that nanofiltration of a solution such as a clarified cane sugar juice or syrup through a membrane with pore size on the order of 20 to 50 Å not only decolorizes the solution, but also produces a permeate having enhanced crystallization properties. The feed can have a color as high as about 25,000 IU. The decolorized permeate can have a color as high as about 3,000, and even at this high level of color may be used for the direct crystallization of white sugar without further processing. No intermediate crystallization of a raw sugar is needed. This novel method can be used to replace, modify, or supplement conventional sugar-refining techniques. The novel technique reduces costs, nearly eliminates the need to purchase chemical reagents, and greatly reduces waste liquid discharge.

The degree of decolorization achieved to date with the novel technique has ranged from 50% to 85%, which is less than the decolorization attained by traditional recrystallization or adsorbent treatments. However, despite the numerically smaller decolorization effect, the crystallization properties of the permeate were superior as compared to a conventionally decolorized syrup. White sugar with color from 10 to 50 IU has been crystallized directly from nanofiltered permeate of color as high as 2,000 to 3,000 IU. These values are substantially higher than the approximate maximum 800 IU color that a traditional refinery liquor may have for crystallizing white sugar.

Membrane filtration preferably uses cross-flow (or tangential flow) of the liquid feed over the membrane, allowing continuous cleaning and high filtration rates, at the expense of having a somewhat larger volume of the reject (final retentate) stream. Periodic cleaning with caustic, acids or a combination of treatments is required only infrequently in the novel process, and when needed usually restores membrane performance easily.

Preferred configurations for the membranes are spiral-wound and hollow fiber configurations for the polymeric membranes used in the nanofiltration, and a tubular, multichannel design for the ceramic membranes used in the initial clarification step. In a spiral-wound membrane, several flat membrane sheets are wound around a central (permeate) tube, and are separated from each other by a polymeric mesh spacer.

Polymeric nanofiltration membranes suitable for use in the novel process may be made, for example, of polyethersulfone, polyvinylpyrrolidone, polytetrafluoroethylene, or polyvinylidene fluoride; and are commercially available from several manufacturers, including Desalination Membrane Products (Escondido, Calif.), Dow/Film Tec Corporation (Minneapolis, Minn.), Osmonics (Minnetonka, Minn.), and Membrane Products Kiryat Weizman Ltd. (Rehovot, Israel).

Clarification of Juice

Prior to nanofiltration for decolorization, the juice, intermediate syrup (20% to 50% dissolved solids), final syrup (50% to 70% dissolved solids), or refinery liquor should be clarified to remove polysaccharides and colloids to give a solution with a turbidity below 1 NTU/Brix. ("NTU" stands for "nephelometric turbidity unit," a standard measure of turbidity.) A preferred method of clarification is to initially clarify juice through conventional means (e.g., liming and settling), followed by ultrafiltration of the clarified juice through a ceramic or polymeric filter having a pore size between about 0.01 and about 0.2 micron, i.e., having an approximate molecular weight cut-off in the range from about 20,000 to about 500,000.

In the prototype trials reported here, clarified juice was prepared in this manner from the 1994 Louisiana sugar cane crop, using ultrafiltration through ceramic membranes. The processed, turbidity-free juice was concentrated, refrigerated, and stored until spring 1995, when the concentrate was decolorized and crystallized as described below.

A membrane system may either be operated in batch mode, where some or all of the retentate is returned to the feed tank, and the processing is stopped when the feed tank level or the filtration flow rate reaches a preset limit; or the system may be operated in a multi-stage design, where within each stage a portion of the retentate is recirculated to provide the required cross-flow velocity on the retentate side of the membrane. A batch mode was used in the prototype testing described here, although a multi-stage mode with three or four stages would be preferred for industrial operations.

"VCF," the volumetric concentration factor, expresses the degree of concentration of impurities in the feed relative to the starting conditions. In batch tests the VCF at a particular time equals the initial feed volume divided by the remaining feed volume at that time. As a batch progressed, the filtration rate declined as VCR increased, due to membrane fouling and the increasing concentration of high molecular weight and colloidal impurities. In prototype tests run until VCF reached 10, the filtration rate declined from an initial range of 250 to 400 $l/m^2/hr$ (147 to 236 $gal/ft^2/day$) to a final range of 150 to 250 $l/m^2/hr$ (88 to 147 $gal/ft^2/day$). For design purposes, a volume-weighted average of 270 $l/m^2/hr$ (159 $gal/ft^2/day$) would be a conservative estimate, which implies about 1,500 $m^2$ (16,140 $ft^2$) of membrane surface for a 10,000 ton/day mill.

The membranes were cleaned daily with dilute caustic soda and phosphoric acid, although cleaning every other day would probably suffice.

As shown in Table I, turbidity was almost completely eliminated by the ultrafiltration step, as were substantial amounts of polysaccharides. Color and Brix, however, were essentially unchanged. (It should be kept in mind that the ICUMSA-recommended color measurement itself involves filtration with a 0.45 $\mu$m membrane prior to measuring absorption at 420 nm; the measurement protocol therefore duplicates the effects of ceramic ultrafiltration. On the other hand, if color were measured without sample filtration a greater color difference between feed and UF permeate would be apparent, although the measurement would be affected by the turbidity of the feed sample.)

Table I depicts the average performance of five, 20-hour clarification test runs with the pilot ceramic ultrafiltration membranes: two KERASEP (Rhone-Poulenc Tech-Sep, Shelton, Conn.), 19 channel, 300,000 molecular-weight-cut-off membranes (i.e., a pore size on the order of 0.05 $\mu$m). The trans-membrane pressure was 3.2 to 4 bar (46 to 58 psi), the temperature was 90° C. (194° F.), and the retentate flow velocity was 6.5 m/s (21 ft/s).

TABLE I

|  | FEED | PERMEATE | % CHANGE |
|---|---|---|---|
| Brix | 14.2 | 14.2 | 0 |
| TURBIDITY, NTU | 240 | 1 | −99.6 |
| COLOR, IU | 11,600 | 11,400 | −2 |
| STARCH, ppm/Bx | 560 | 300 | −46 |
| DEXTRAN, ppm/Bx | 620 | 140 | −77 |

Decolorization of Ultrafiltered Juice

Syrup prepared from the ultrafiltered juice was diluted to 15 Brix, and was then processed in a series of 100 to 200 liter batch tests on a polymeric membrane pilot unit equipped with one 6 cm×100 cm (2.5 inch×40 inch) spiral-wound G-10 thin-film (TFM) membrane (Desalination Membrane Products, Escondido, Calif.), with 2,500 molecular weight cut-off, and a surface area of 2.5 $m^2$ (27 $ft^2$). A nanofiltration membrane with a molecular cut-off in the range from about 2,000 to about 10,000 should work in practicing this invention. Although the membrane could tolerate temperatures up to 90° C. (194° F.), it was found that the efficiency of color rejection decreased with increasing temperature over the range 50° C. to 90° C. Increasing the transmembrane pressure slightly increased the efficiency of color rejection. The high end of the recommended operating pressure (400 psi) was therefore used in most tests of membrane performance.

Depending on the temperature, at the operating pressure of 400 psi the filtration flow rate through this membrane started in a range of 35 to 63 $l/m^2/hr$ (21 to 38 $gal/ft^2/day$) at VCF=1, and dropped to a range of 14 to 21 $l/m^2/hr$ (8.4 to 12.6 $gal/ft^2/day$) at VCF=10. The middle of the temperature range, about 65° C. (175° F.) was preferred as giving a good compromise between the competing considerations of higher flow rate (higher temperatures) and lower color (lower temperatures). 65° C. was close to the maximum temperature for which this membrane would still give a syrup that could be boiled directly to a white sugar product. At 65° C., an average flow rate of 28 to 35 l/m$^2$/hr (16.8 to 21 gal/ft$^2$/day) is realistic for design purposes. With increasing VCF (and time) the colorants (and to a lesser degree other non-water components) were concentrated in the feed tank, the Brix increased to close to 30, and the color of the permeate product also increased. However, color removal (=1−(color of permeate/color of feed)) also increased as the average molecular weight of colorants in the feed increased.

Depending on the economics of a particular refining operation, it may be desirable to use diafiltration in the clarification, in the decolorization, or in both. In diafiltration, water is added to the retentate (for example, at a rate equal to the permeate flow rate) to reduce sucrose loss in the final concentrated retentate.

The retentates from several batch tests (each at VCF 10) were combined, diluted with an equal amount of water to a Brix close to 15, and reprocessed, this time to VCF 8. The filtration rate fell within the same range as that for the other tests, indicating that the flow rate was primarily controlled by the Brix (overall solids concentration) of the solution, rather than by the concentration of the high molecular weight species. The sugar loss in the decolorization retentate following such reprocessing was low, on the order of 1.5%.

Cleaning of the decolorization membranes with dilute caustic solutions was simple to perform, and was required only infrequently. In fact, no cleaning was performed between individual batch tests, only a brief rinsing with deionized water. Cleaning was performed only before a longer shut down, and was accomplished by thorough flushing with water, followed by cleaning with a 0.1% sodium hydroxide solution and sterilizing with a formaldehyde solution.

Table II gives the properties and operating parameters of the G-10 thin-film nanofiltration elements (Desalination Systems Inc., Escondido, Calif.).

TABLE II

| | |
|---|---|
| MOLECULAR WEIGHT CUTOFF | 2,500 |
| TYPICAL OPERATING PRESSURE | 5–28 bar |
| | 70–400 psi |
| MAXIMUM PRESSURE | 41 bar |
| | 600 psi |
| MAXIMUM TEMPERATURE | 90° C. |
| | 194° F. |
| pH, OPERATION | 2–11 |
| pH, CLEANING | 2–11.5 |
| CHLORINE TOLERANCE | 20–50 ppm-days |

TABLE II-continued

| REJECTION, % | |
|---|---|
| SODIUM CHLORIDE | 10 |
| SUCROSE | 50 |
| DEXTRAN, <1,000 Mw | 90 |
| DEXTRAN, 1,500 Mw | 95 |

Crystallization of Treated Liquors

An unexpected advantage of the novel decolorization process was that the resulting permeate had uniquely advantageous crystallization properties. White sugar may be crystallized directly from the permeate, without further processing. Table III gives results of otherwise identical crystallization tests conducted with (a) a conventionally processed syrup, (b) a syrup (UF) from juice clarified with ceramic ultrafiltration membranes, and (c) a syrup (UF/NF) prepared from juice that was first ultrafiltered and then partially decolorized with the nanofiltration polymeric membrane as described above. In each case, a 60 Brix syrup (600 ml) was concentrated under vacuum (at ~50° C., 148° F.) to 73 Brix, seeded with 4 g of 0.25–0.50 mm fine refined sugar, and crystallized for 4 to 5 hours, in motion (rotovap) under vacuum at an evaporation rate of 13 to 18 ml/h. The crystals were then separated, with no washing, in a laboratory centrifuge (20 min, ~3,000 RPM, ~600 G). To wash (affine) the crystals, a part of the unwashed sugar was mingled (15 min) at ambient temperature with a saturated solution of refined sugar, and recentrifuged for 10 minutes as before. In Table III, the row labelled "1" refers to the feed syrup; the rows labelled "2" refer to the unwashed sugar; and the rows labelled "3" refer to the washed sugar.

The control, a conventional syrup (i.e., no membrane treatment) prepared from the same clarified juice, was also crystallized. The resulting sugar color was 2,200 IU before washing, and 1,100 IU after washing, similar to the amount of color typically obtained in industrial practice. Sugar from liquors treated with ceramic membranes (UF) averaged 1,200 and 290 IU, respectively.

The average color estimated for the UF/NF white sugar was a conservative estimate, because the decolorization (nanofiltration) tests involved a range of conditions, some conducted at a temperature that was sub-optimal for color removal. In addition, a significant color increase (up to 1,000 IU) occurred in concentrating some batches of the UF/NF juice in the evaporator; this was attributed to operator error in overheating the evaporator. Nevertheless, the color of the washed UF/NF sugars averaged 46 IU, with an estimate of 25 IU washed sugar color when the decolorization was performed at the preferred operating conditions of 28 bar (400 psi) and 65° C. (121° F.).

TABLE III

| | | CONVENTIONAL | | | UF | | | UF/NF | | |
|---|---|---|---|---|---|---|---|---|---|---|
| | | min | max | average | min | max | average | min | max | average |
| COLOR | 1 | 12,300 | 16,200 | 14,200 | 11,500 | 16,800 | 14,300 | 2,360 | 5,500 | 3,590 |
| IU | 2 | 1,520 | 3,120 | 2,160 | 773 | 1,650 | 1,170 | 91 | 564 | 304 |
| | 3 | 607 | 1,680 | 1,060 | 130 | 485 | 294 | 15 | 119 | 46 |
| ASH | 2 | 0.21 | 0.28 | 0.24 | 0.19 | 0.52 | 0.27 | 0.083 | 0.26 | 0.18 |
| % | 3 | 0.049 | 0.078 | 0.047 | 0.017 | 0.021 | 0.019 | 0.006 | 0.016 | 0.012 |
| INVERT | 2 | 0.20 | 0.23 | 0.21 | 0.16 | 0.40 | 0.21 | 0.18 | 0.33 | 0.25 |
| % | 3 | 0.035 | 0.055 | 0.045 | 0.019 | 0.04 | 0.028 | 0.02 | 0.042 | 0.028 |

The color transfer ratio (sugar color/liquor color) was higher for conventional syrups than for UF/NF syrups. The observed color transfer ratio for the UF/NF syrups was only about 30% to 40% of values that have been reported, for example, for South African refinery liquors decolorized with carbonatation and ion exchange. (G. Lionnet, "Colour transfer from liquor to crystal during the refining of South African raw sugar," CITS, Proc. XIXth General Assembly, p. 15, Cambridge, 1991.) A conventional refinery liquor must have 600 to 800 IU color or lower after decolorization to achieve a refined white sugar color of 25 IU. By contrast, the same product color can be produced from UF/NF cane liquors at the much higher 3,000 IU color. In this respect the membrane-treated cane syrups behave similarly to beet syrups, for which the syrup color/sugar color ratio is on the order of 120.

Although not yet measured, the removal of proteins and polysaccharides with nanofiltration membranes should be essentially absolute, thereby producing a uniform product regardless of fluctuations in cane quality.

In addition to its applicability to cane juice and syrup, the present invention will also be useful in the desugarization of molasses.

Based on previously published data and supplier information, the overall capital cost, including the cost for membranes, for a 10,000 ton/day mill is estimated at $5.2 million for a ceramic clarification system, and $3.3 million for a polymeric decolorization line, for a total cost of $8.6 million. See Tables IV through VI, giving estimated capital and operating costs for the production of white cane sugar by sequential treatment with ceramic clarification membranes and polymeric decolorization membranes. The major components of operating costs, other than depreciation, are expected to be those associated with membrane replacement and power requirements, the latter primarily for retentate recirculation. Total operating costs are estimated at $24.10 and $12.90 per ton of sugar, for 3 month/year and 6 month/year operations, respectively. Assuming a $0.036/lb price differential between white sugar and raw sugar, and a membrane lifetime of one season, the payback time for the investment required for such plants is only 1.5 or 0.6 years, respectively.

The combination of clarification and decolorization membranes offers a realistic alternative to traditional refining technology, a technology that increasingly suffers from high reagent chemical costs, waste disposal costs, and energy costs.

TABLE IV

CAPITAL COST
in dollars, per cubic meter per day of juice capacity

|  | Ceramic membrane system | Polymeric membrane system | Total |
|---|---|---|---|
| Total capital costs, excluding membranes, assuming: ceramic system at $2,200/m$^2$ and 0.15 m$^2$/m$^3$/day juice polymeric system at $240/m$^2$ and 1.1 m$^2$/m$^3$/day juice | 330 | 274 | 604 |
| Total membrane costs, assuming: ceramic membrane at $1,300/m$^2$ polymeric membrane at $50/m$^2$ | 195 | 57 | 252 |
| TOTAL CAPITAL COST | 525 | 331 | 856 |

TABLE V

OPERATING COST,
in dollars per cubic meter of juice

|  | Ceramic membrane system | | Polymeric membrane system | | Total | |
|---|---|---|---|---|---|---|
| Days of operation per year: | 90 | 180 | 90 | 180 | 90 | 180 |
| Depreciation, assumed to be 20% of capital costs per year, exclusive of membranes | 0.73 | 0.37 | 0.61 | 0.30 | 1.34 | 0.67 |
| Membrane replacement, assuming: ceramic membrane life, six seasons polymeric membrane life, one season | 0.36 | 0.18 | 0.63 | 0.32 | 0.99 | 0.50 |
| Electricity at $0.07/kWh | 0.28 | 0.28 | 0.10 | 0.10 | 0.38 | 0.38 |
| Chemicals (NaOH, NaOCl, H$_3$PO$_4$) | 0.01 | 0.01 | 0.00 | 0.00 | 0.01 | 0.01 |
| TOTAL OPERATING COST | 1.38 | 0.84 | 1.34 | 0.62 | 2.72 | 1.46 |

TABLE VI

PROFIT ANALYSIS

|  | 90 days/season | 180 days/season |
|---|---|---|
| TOTAL OPERATING COST, dollars per ton of sugar, at 0.113 ton sugar/m³ juice | 24.1 | 12.9 |
| PAYBACK, YEARS at $80/ton sugar gross profit | 1.5 | 0.6 |

I claim:

1. A process for producing white crystalline sucrose from an aqueous liquid comprising a clarified cane sugar juice, a clarified cane sugar syrup, a clarified cane sugar molasses, or a clarified cane sugar refinery liquor; wherein the liquid is essentially free from compounds having a molecular weight greater than about 500,000, and wherein the liquid has a color between about 5,000 IU and about 25,000 IU; wherein a solid-phase raw sugar is present at no point during said process; and wherein said process comprises the steps of:
   (a) filtering the liquid across a membrane with a molecular weight cut-off between about 2,000 and about 10,000 to produce a permeate having a color less than or equal to about 3,000 IU; and
   (b) crystallizing sucrose from the permeate, to produce white crystalline sucrose having a color less than or equal to about 50 IU.

2. A process as recited in claim 1, additionally comprising the step of washing the crystallized sucrose.

3. A process as recited in claim 1, wherein the membrane has a molecular weight cut-off of about 2,500.

4. A process as recited in claim 1, wherein said filtering step is performed at a temperature less than or equal to about 65° C.

5. A process as recited in claim 1, wherein said filtering step is performed at a temperature of about 65° C.

6. A process as recited in claim 1, additionally comprising the preliminary step of preparing the liquid by first clarifying a sugar cane juice to remove particulates, and then by filtering the clarified juice across a membrane having a molecular weight cut-off between about 20,000 and about 500,000.

7. A process as recited in claim 1, additionally comprising the preliminary step of preparing the liquid by first clarifying a sugar cane juice to remove particulates, and then by filtering the clarified juice across a membrane having a molecular weight cut-off of about 300,000.

8. A process as recited in claim 1, additionally comprising the step of adding water to the liquid during said filtering step.

9. A process as recited in claim 1, wherein said crystallizing step produces white crystalline sucrose having a color less than or equal to about 25 IU.

10. A process for producing white crystalline sucrose from cane sugar juice; wherein a solid-phase raw sugar is present at no point during said process; and wherein said process comprises the steps of:
   (a) clarifying the juice to remove particulates;
   (b) filtering the clarified juice across a membrane having a molecular weight cut-off of about 300,000 to produce a first permeate having a color between about 5,000 IU and about 25,000 IU;
   (c) filtering the first permeate across a membrane with a molecular weight cut-off of about 2,500 at a temperature of about 65° C. to produce a second permeate having a color less than or equal to about 3,000 IU;
   (d) crystallizing sucrose from the second permeate; and
   (e) washing the crystallized sucrose to yield white crystalline sucrose having a color less than or equal to about 50 IU.

11. A process as recited in claim 10, wherein said crystallizing step produces white crystalline sucrose having a color less than or equal to about 25 IU.

* * * * *